W. LA HODNY.
BRACKET FOR SUPPORTING MIRRORS.
APPLICATION FILED FEB. 2, 1921.
1,420,268.
Patented June 20, 1922.
2 SHEETS—SHEET 1.
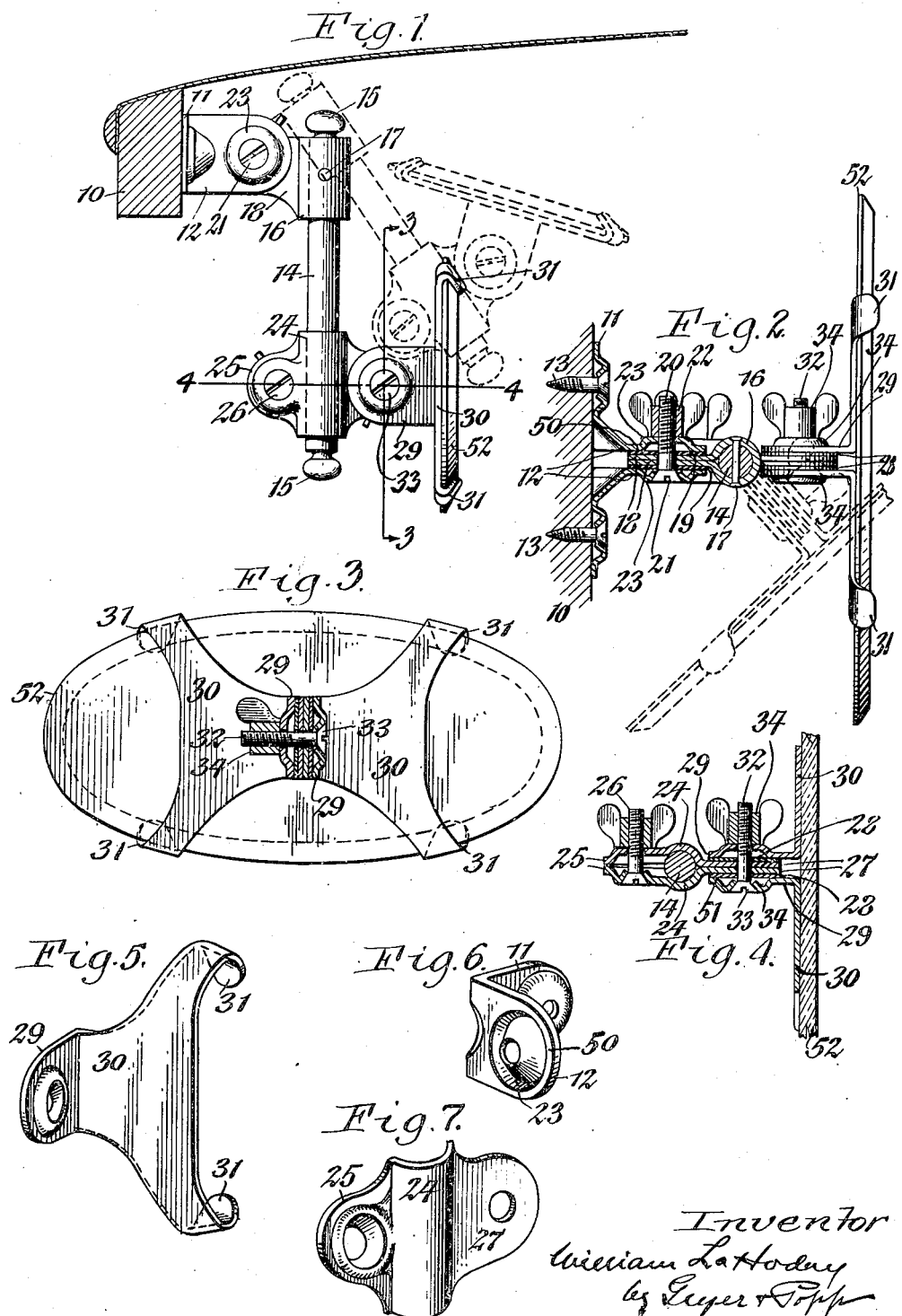

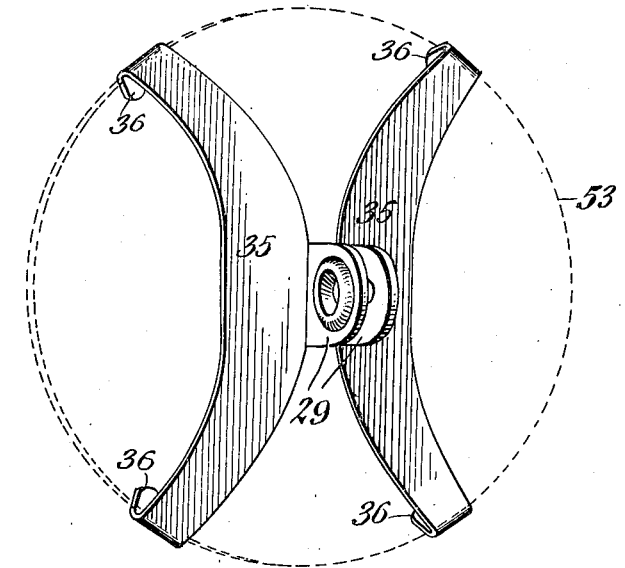
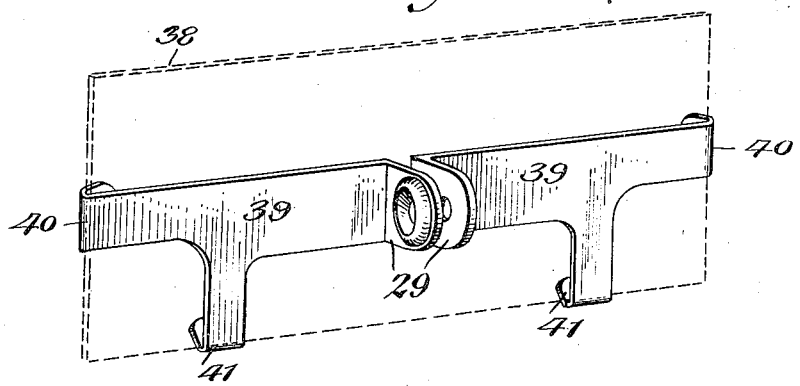

UNITED STATES PATENT OFFICE.

WILLIAM LA HODNY, OF BUFFALO, NEW YORK.

BRACKET FOR SUPPORTING MIRRORS.

1,420,268.  Specification of Letters Patent.  Patented June 20, 1922.

Application filed February 2, 1921. Serial No. 441,765.

*To all whom it may concern:*

Be it known that I, WILLIAM LA HODNY, a citizen of the United States, residing in Buffalo, in the county of Erie and State of New York, have invented new and useful Improvements in Brackets for Supporting Mirrors, of which the following is a specification.

This invention relates to a bracket which is more particularly designed for supporting a mirror on an automobile to permit the occupants to observe what is going on behind. The principal object of this invention is the provision of a bracket of this character which can be readily adjusted to give a good view of the scene in rear of the car or moved into a position in which it is out of the way and which will remain securely in whatever position the same may be adjusted without liability of being displaced by the vibration of the car.

In the accompanying drawings:

Figure 1 is a side elevation of my improved bracket supporting a mirror on the frame of an auto top which latter is shown in section. Figure 2 is a top plan view of the same. Figure 3 is a vertical transverse section taken on line 3—3, Fig. 1. Figure 4 is a horizontal section taken on line 4—4, Fig. 1. Figures 5, 6 and 7 are perspective views of different parts of this bracket. Figures 8 and 9 are similar views of parts of a bracket for supporting a round and a rectangular mirror.

Similar characters of reference refer to like parts throughout the several views.

Although this bracket may be employed for supporting a mirror on any suitable support, the same in this instance shows the mirror mounted on the frame 10 of an auto top immediately above the driver's seat.

In its general organization the bracket comprises a base adapted to be mounted on a support such as the frame 10, an intermediate supporting arm pivoted at its upper end on the base to swing vertically, and a head adapted to carry the mirror and pivotally connected by a universal joint with the lower end of the arm so as to permit the mirror to be swung both vertically and horizontally relatively to the arm.

The base comprises two L-shaped angle sections or pieces which are preferably stamped out of sheet metal and each of which has a transverse foot 11 and a longitudinal lug 12 projecting rearwardly from the foot. These two base sections are arranged side by side so that their lugs are opposed to each other but spaced apart, the two feet of the same being secured to the frame 10 by screws 13.

The intermediate arm of the bracket is preferably constructed of an upright rod 14 of metal which terminates at its upper and lower ends in ornamental knobs 15. The means for pivotally connecting this arm with the base comprises a coupling having an upright split sleeve 16 which is mounted on the upper end of the arm and secured thereto by a pin 17, two pivot ears 18 projecting forwardly from the longitudinal edges of the split sleeve and arranged between the pivot lugs of the base, fiber washers 19 interposed between the pivot ears 18 and the pivot lugs 12, and a pivot and clamping bolt 20 having its shank passing horizontally through the pivot lugs 12, ears 18 and washers 19 and engaging its head 21 with the outer side of one of said lugs and its thumb nut 22 with the outer side of the other of said lugs. Each of the ears 18 is preferably flat and bears against the inner side of one of the washers but each of the lugs 12 is dished outwardly in the form of an annular embossment 23 concentrically around the opening therein through which the bolt 20 passes, as shown in Fig. 2. By means of this construction the two pivot lugs 12 upon being drawn together by the bolt 20 produce a pressure against the outer sides of the pivot ears at a distance from the axis of the bolt 20 whereby a greater leverage and more extensive and effective bearing surface 50 of annular form is obtained which operates to hold the swinging arm securely by friction in whatever position the same may be adjusted.

The head for supporting the mirror and the means for adjustably connecting the same with the lower end of the arm are constructed as follows:—

24, 24 represent the two vertical semi-cylindrical sleeve sections of two clips which embrace the lower part of the intermediate arm and engage frictionally therewith so that these clips can slide vertically and also turn horizontally on this arm and thus permit of adjusting the mirror mounted on the clips accordingly. The front edges of these sleeve sections are provided with forwardly projecting lugs 25 which are connected by a bolt 26 having a wing nut so that the sleeve sections may be clamped frictionally on the arm in any desired position. On the rear edges of the sleeve sections the same are provided with rearwardly projecting pivot ears 27 which are arranged vertically and engage with each other. Each of these clips constitutes a sleeve section and its front lug and rear ear is formed of a single piece of sheet metal. On opposite outer sides of these pivot ears are arranged friction washers 28 of fiber or similar material and these are in turn engaged on their outer sides by two vertical pivot lugs 29, which project forwardly from the opposing inner edges of two transverse plates 30 arranged side by side back of the mirror. Each of these plates is provided at its upper and lower ends with hooks or prongs 31 which engage over the edge of the mirror 52. Each of these plates together with its hooks and pivot lugs forms in effect a yoke which is formed integrally of sheet metal. In the case of an oval mirror the hooks of one yoke plate engage with the edge of the mirror on one side of its minor diameter and the hooks of the other plate on the opposite side of said diameter, whereby upon drawing the two yokes toward each other the hooks of both yokes will be wedged upon the edge of the mirror owing to the gradual increase of its width toward the minor diameter of the mirror. The two yokes are drawn toward each other and also pivotally and frictionally connected with the clip by a horizontal clamping bolt 32 which passes through corresponding openings in the ears 27, washers 28 and pivot lugs 29 and bears with its head 33 against the outer side of one of the yoke lugs 29 while its nut 34 bears against the outer side of the companion yoke lug. By means of this pivotal connection between the yokes and the clips the mirror may be turned so as to stand at such angle which will reflect the desired view in rear of the car and it also permits of turning the mirror toward the roof of the auto top, as shown by dotted lines in Fig. 1, when the mirror is not required or for clearing the path of the wind shield when it is desired to open the latter.

The metal of the yoke lugs immediately around the bolt openings thereof is dished outwardly so as to form an annular embossment 34, as shown in Fig. 4, concentrically around said openings. By this means the yoke lugs engage the ears of the clips on a circular line 51 which is arranged some distance from the bolt 32, whereby a greater leverage and more extensive and effective bearing surface is obtained which operates to securely hold the mirror in whatever position the same may be adjusted and prevents the same from being jarred out of place by the vibrations of the car when the same is running over the roadway.

This invention is equally applicable for holding round mirrors and rectangular mirrors. In the case of round mirrors 53 the plate 35 of each yoke is made somewhat narrower and the hooks 36 of the two yokes are brought closer together to fit the edge of the round mirror 53, as shown in Fig. 8. For using this invention on a rectangular mirror 38, as shown in Fig. 9, the plate 39 of each yoke has a side hook 40 engaging one of the vertical edges of the mirror and a lower hook 41 engaging the lower horizontal edge of the mirror. Otherwise the bracket for use in connection with the structure shown in Figs. 8 and 9 may be substantially like that shown in Figs. 1–4.

I claim as my invention:

A mirror bracket comprising a base adapted to be attached to a support, an upright supporting rod pivotally connected with said base to swing vertically, two clips capable of sliding lengthwise on the lower part of said rod and also turning thereon and consisting of two semi-cylindrical sleeve sections embracing opposite sides of said rod and provided on one pair of their corresponding edges with two laterally projecting clamping lugs and on their other pair of corresponding edges with laterally projecting pivot ears, a clamping bolt connecting said clamping lugs, a head adapted to support a mirror and having two pivot lugs which receive between them said pivot ears, and a pivot bolt passing through said pivot lugs and ears.

WILLIAM LA HODNY.